United States Patent [19]
Noaki et al.

[11] Patent Number: 5,449,697
[45] Date of Patent: Sep. 12, 1995

[54] ION EXCHANGE MEMBRANE USED FOR A FUEL CELL

[75] Inventors: Yasuhide Noaki, Nobeoka; Saburo Okamoto, Higashiusuki, both of Japan

[73] Assignee: Asahi Kasei Kogyo Kabushiki Kaisha, Osaka, Japan

[21] Appl. No.: 244,210
[22] PCT Filed: Feb. 25, 1994
[86] PCT No.: PCT/JP94/00304
 § 371 Date: Jun. 4, 1994
 § 102(e) Date: Jun. 4, 1994
[87] PCT Pub. No.: WO94/19839
 PCT Pub. Date: Sep. 1, 1994

[30] Foreign Application Priority Data

Feb. 26, 1993 [JP] Japan ................. 5-038529
Mar. 18, 1993 [JP] Japan ................. 5-058932

[51] Int. Cl.$^6$ .............................. C08J 5/22
[52] U.S. Cl. ..................... 521/27; 521/31; 521/33; 526/243; 526/247; 526/253
[58] Field of Search ............ 521/27; 526/243, 247, 526/253

[56] References Cited

U.S. PATENT DOCUMENTS 4,243,508  1/1981  Dankese ..................... 204/301

FOREIGN PATENT DOCUMENTS 049876   8/1992  European Pat. Off. .
0498076  8/1992  European Pat. Off. .
57-92026 6/1982  Japan ..................... 521/27
62-196389 8/1987 Japan .
62-288617 12/1987 Japan .
WO86/06879 11/1986 WIPO .

OTHER PUBLICATIONS

J. D. Weaver et al., "Catalysis Today", 14 (1992) 195–210, Elsevier (Amsterdam).

Primary Examiner—Fred Zitomer
Attorney, Agent, or Firm—Birch, Stewart, Kolasch & Birch

[57] ABSTRACT

The present invention provides an ion exchange membrane used for a proton exchange membrane type fuel cell comprising a repeating unit represented by the following formula $$-[(CF_2-CF_2)_L-(CF_2-CF)_m]- \atop \underset{\underset{CF_3}{|}}{(OCF_2-CF)_x-O-(CF_2)_y-SO_3H}} \quad (1)$$

wherein x is 0, 1 or 2, y is 2 or 3, L and m are positive numbers and L/m is a positive number of 10 or less; and having an electrical conductivity of 0.11 to 0.30 $\Omega^{-1}$ cm$^{-1}$ at 25° C., a permeability coefficient to hydrogen gas of $9.0\times10^{-9}$ to $24.0\times10^{-9}$ cc cm/(cm$^2$ sec cmHg) at 40° C., a permeability coefficient to oxygen gas of $5.0\times10^{-9}$ to $11.0\times10^{-9}$ cc cm/(cm$^2$ sec cmHg) at 40° C. and a water content of more than 100 to 250% by weight.

According to the present invention, the ion exchange membrane used for a proton exchange membrane type fuel cell having excellent performance as a diaphragm and an electrolyte can be provided.

9 Claims, 3 Drawing Sheets

ION EXCHANGE MEMBRANE USED FOR A FUEL CELL

TECHNICAL FIELD

The present invention relates to an ion exchange membrane used as an electrolyte and a diaphragm for a proton exchange membrane type fuel cell. Particularly, it relates to an ion exchange membrane having excellent performance as an electrolyte and a diaphragm for a proton exchange membrane type fuel cell.

BACKGROUND ART

A fuel cell produces electrical energy by electrochemically oxidizing a fuel such as hydrogen and methanol in the cell to directly convert the chemical energy of the fuel into electrical energy. Fuel cells have recently drawn attention as a clean supply source for electrical energy.

Fuel cells are classified into a phosphoric acid type, a molten salt of a carbonic acid type, a solid oxide type and a solid polymer electrolyte type. Of these, the solid polymer electrolyte type fuel cell using a cation exchange mambrane as an electrolyte is called a proton exchange membrane type fuel cell. The proton exchange membrane type fuel cell is expected as a portable electric source such as an electric source for an electric car and a simple auxiliary electric source because it has high energy density even at a low operating temperature of 100° C. or less.

A proton exchange membrane type fuel cell comprises an ion exchange membrane and a pair of gas diffusion electrodes bonded to both sides of the ion exchange membrane. Each gas diffusion electrode has a catalyst at least on a side thereof facing the ion exchange membrane. The cell is operated by feeding a fuel such as hydrogen to one gas diffusion electrode and feeding an oxidizing agent such as oxygen and air to the other gas diffusion electrode respectively, and connecting an external load circuit to both gas diffusion electrodes.

That is, a proton (a hydrogen ion) and an electron are generated due to the oxidization of fuel at one gas diffusion electrode. The proton is transferred to the other gas diffusion electrode through the membrane by conduction and there, water is produced by the reaction of the proton with oxygen contained in the oxidizing agent. At this time, the electron generated at one gas diffusion electrode is transferred to the other through the external load circuit to obtain electrical energy.

As mentioned above, in a proton exchange membrane type fuel cell, an ion exchange membrane operates as an electrolyte to conduct the proton. Further, the ion exchange membrane substantially forms one body structure with the gas diffusion electrodes due to a bonding of the electrodes to both sides of the membrane. Therefore, the ion exchange membrane also plays a part of a diaphragm by not allowing fuel to mix directly with the oxidizing agent.

The ion exchange membrane used for the proton exchange membrane type fuel cell requires low electrical resistance, quick movement of water through the ion exchange membrane, high water retention characteristics to maintain low electrical resistance and permeability to gases, which allows oxygen gas and hydrogen gas to be fed to the electrodes at a high enough speed. In addition, the ion exchange membrane requires an appropriate permeability to gases, excellent chemical stability during prolonged use and strong physical strength in view of its role as a diaphragm.

As a conventional ion exchange membrane used for the proton exchange membrane type fuel cell, for example, NAFION (registered trademark) manufactured by E.I. du Pont de Nemours and Co. having a fluororesin as a main chain of a polymer and a sulfonic acid group as an ion exchange group is used.

However, the conventional ion exchange membrane used for the proton exchange membrane type fuel cell can not respond to the increased request these days for a proton exchange membrane type fuel cell having high performance. The conventional ion exchange membrane is excellent in chemical permanence properties and stability. However, it has high electrical resistance. Further, it easily becomes dry due to low water retention characteristics so that proton conductivity is reduced or the reaction of fuel gas or oxidizing agent gas is inhibited at the electrode having a catalyst.

International Unexamined Patent Publication No. Wo86/06879 discloses a diaphragm used for a fuel cell having an equivalent weight of less than 1000 g/eq and strong physical strength. This ion exchange membrane has relatively high strength even at a high temperature of 110° C. or more. However, when it is used for fuel cell at a temperature of 100° C. or less, its performance is not sufficient.

European Patent Unexamined Publication No. 0498076 discloses an ion exchange membrane having an equivalent weight of 700 to 1000 g/eq and a water content of 35 to 100% by weight. When it is used for a fuel cell, which is operated at a low pressure of about 1 atm., or uses air as an oxygen resource, its performance is not sufficient.

Neither of the above-mentioned ion exchange membranes has necessary performance as a diaphragm and an electrolyte when used for a fuel cell.

The present invention has been completed to overcome the above-described problems of the prior art. That is, the present invention provides an ion exchange membrane used for a proton exchange membrane type fuel cell having excellent performance as a diaphragm and an electrolyte by specifying the molecular structure of the ion exchange membrane and limiting its electrical conductivity, permeability to gases and water content to appropriate ranges. The proton exchange membrane type fuel cell comprising the ion exchange membrane of the present invention can maintain high output performance for a long time.

SUMMARY OF THE INVENTION

The present invention provides an ion exchange membrane used for a proton exchange membrane type fuel cell comprising a repeating unit represented by the following formula (1):

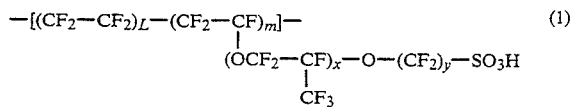

wherein x is 0, 1 or 2, y is 2 or 3, L and m are positive numbers and L/m is of 10 or less; and having an electrical conductivity of 0.11 to 0.30 $\Omega^{-1}$ cm$^{-1}$ at 25° C., a permeability coefficient to hydrogen gas of $9.0 \times 10^{-9}$ to $24.0 \times 10^{-9}$ cc cm/(cm$^2$ sec cmHg) at 40° C., a permeability coefficient to oxygen gas of $5.0 \times 10^{-9}$ to $11.0 \times 10^{-9}$ cc cm/(cm$^2$ sec cmHg) at 40° C. and a water content of more than 100 to 250% by weight.

L, m and L/m of formula (1) depend on an equivalent weight of the ion exchange membrane. L/m represents an average ratio of parts derived from tetrafluoroethylene of the copolymer to parts derived from a monomer represented by the following formula (2):

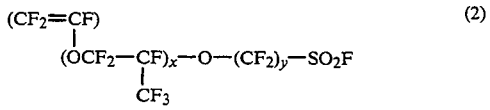

wherein x is 0, 1 or 2 and y is 2 or 3. The value of L/m is $0 < L/m \leq 10$ and includes a decimal. L/m is calculated by measurement of the equivalent weight. The equivalent weight of the ion exchange membrane mentioned here represents a weight (g) of a dry ion exchange resin having 1 eq of an exchange group.

A polymer comprising a repeating unit represented by formula (1) can be synthesized by conventionally known methods.

These methods include a method of dissolving the monomer represented by formula (2) in a solvent, and then reacting a monomer represented by formula (2) with tetrafluoroethylene gas to polymerize and a method of putting the monomer represented by formula (2) and a surfactant into water, emulsifying them and reacting the monomer with tetrafluoroethylene gas.

The equivalent weight of the ion exchange membrane can be determined by a ratio of a reaction amount of tetrafluoroethylene to that of the monomer represented by formula (2).

The ion exchange membrane of the present invention has a electrical conductivity of 0.11 to 0.30 $\Omega^{-1}$cm$^{-1}$ at 25° C.

When the electrical conductivity of the ion exchange membrane of the present invention is too low at 25° C., the output performance of the fuel cell is remarkably low. When it is too high at 25° C., the strength of the membrane is low. Therefore, the ion exchange membrane of the present invention has a electrical conductivity of 0.11 to 0.30 $\Omega^{-1}$cm$^{-1}$, preferably 0.18 to 0.27 $\Omega^{-1}$cm$^{-1}$, more preferably 0.20 to 0.27 $\Omega^{-1}$cm$^{-1}$, at 25° C.

The ion exchange membrane of the present invention has a permeability coefficient to hydrogen gas of $9.0 \times 10^{-9}$ to $24.0 \times 10^{-9}$ cc cm/(cm$^2$ sec cmHg) at 40° C. and a permeability coefficient to oxygen gas of $5.0 \times 10^{-9}$ to $11.0 \times 10^{-9}$ cc cm/(cm$^2$ sec cmHg) at 40° C.

When the permeability coefficient to gases of the ion exchange membrane is too high, the output of the fuel cell is low because a large amount of hydrogen diffuses to an oxygen electrode and then besides the reduction reaction of oxygen, the oxidation reaction of hydrogen occurs at the same time. When the permeability coefficient to gas of the ion exchange membrane is too low, the output of the fuel cell is remarkably low because gas feed is inhibited and then the reaction does not proceed at the electrode. Therefore, the permeability coefficient to hydrogen gas is $9.0 \times 10^{-9}$ to $24.0 \times 10^{-9}$ cc cm/(cm$^2$ sec cmHg), preferably $11.0 \times 10^{-9}$ to $24.0 \times 10^{-9}$ cc cm/(cm$^2$ sec cmHg), more preferably $13.5 \times 10^{-9}$ to $24.0 \times 10^{-9}$ cc cm/(cm$^2$ sec cmHg), at 40° C. The permeability coefficient to oxygen gas is $5.0 \times 10^{-9}$ to $11.0 \times 10^{-9}$ cc cm/(cm$^2$ sec cmHg), preferably $7.0 \times 10^{-9}$ to $11.0 \times 10^{-9}$ cc cm/(cm$^2$ sec cmHg), more preferably $8.0 \times 10^{-9}$ to $11.0 \times 10^{-9}$ cc cm/(cm$^2$ sec cmHg), at 40° C.

The ion exchange membrane of the present invention has a water content of more than 100 to 250% by weight. When the water content of the ion exchange membrane is too low, the output of voltage is low so that high current density and high output can not be maintained when a pressure of oxygen or hydrogen is low or air is used as an oxygen source. Further, the electrical conductivity or the permeability coefficient to gases undesirably changes according to a small change in the operating conditions. When the water content of the ion exchange membrane is too high, the strength of the membrane is low and amounts of oxygen and hydrogen, which pass through the ion exchange membrane, suddenly increase. Therefore, the water content of the ion exchange membrane is more than 100 to 250% by weight, preferably 107 to 250% by weight, more preferably 125 to 250% by weight.

In the present invention, the equivalent weight of the ion exchange membrane is not particularly limited, however, preferably it is 700 to 1100 g/eq, more preferably it is 800 to 1080 g/eq. When the equivalent weight is too high, it is difficult to exceed a certain water content because of the low density of an ion exchange group and because the electrical conductivity is disadvantageously low. When the equivalent weight is too low, it is difficult to obtain a homogeneous membrane because of membrane forming properties. Even if the membrane can be obtained by processing, it has a drawback in extremely low strength.

A thickness of the ion exchange membrane is not particularly limited, however it is appropriately 50 to 500 μm.

According to the above mentioned features, the ion exchange membrane used for the fuel cell having excellent water retention characteristic and high performance can be obtained even if the fuel cell is operated at a low gas pressure or uses air as an oxygen source.

The higher an operating pressure of the fuel cell is, the higher output it can produce. When the fuel cell is operated at a low pressure of 1 to 2 atm., or uses air as an oxygen, the output is extremely low. According to the ion exchange membrane of the present invention, a high output current can be obtained even under the conditions of 1 atm. and 55° C., or a applied pressure of 5 atm. or more.

As a method for obtaining the membrane having the electrical conductivity, the permeability coefficient to hydrogen gas, the permeability coefficient to oxygen gas and the water content, in the above ranges, known methods for obtaining a swelled membrane can be applied.

Known methods for obtaining the swelled membrane include a method wherein when an ion exchange group is introduced to a sheet comprising a sulfonic acid group precursor, swelling treatment is conducted with a treatment liquid comprising a water-soluble organic solvent at the same time and a method of swelling the ion exchange membrane by dipping it in water in an autoclaver at a temperature 100° C. or more and a pressure of atmospheric pressure or more.

Particularly, it is preferable to dip an acid type or a base such as sodium and lithium type membranes in a water-soluble organic solvent such as ethylene glycol, polyethylene glycol, triethanolamine and diethanolamine and conduct heat treatment at a temperature of 100° C. or more, preferably 120° C. or more, because it is easy to control swelling of the membrane.

When the swelling treatment is conducted at a high temperature as mentioned above, the value of the water content of the ion exchange membrane does not easily change to its original one. Even if the ion exchange membrane being subjected to swelling treatment is used for the fuel cell, the water content of the ion exchange membrane is maintained. Therefore, it is preferably used for the fuel cell.

In order to assemble the proton exchange membrane type fuel cell by using the above mentioned ion exchange membrane, a gas diffusion electrode and membrane assembly, a frame of a fuel cell, a gas feeding device and the like are used.

The gas diffusion electrode comprises an electric conductor having fine particles of a catalyst metal and, if necessary, a water repellant. With respect to the catalysts on the electric conductor, the catalysts are not particularly limited as long as they are metals, which promote the oxidation reaction of hydrogen and the reduction reaction of oxygen. They include platinum, gold, silver, palladium, iridium, rhodium, ruthenium, iron, cobalt, nickel, chromium, tungsten, manganese, vanadium and alloys of them. Of these, platinum is mainly used.

The metal of the catalyst generally has a particle diameter of 10 to 300 Å. The smaller the particle diameter of the metal is, the higher its performance is. However, it is difficult to make a catalyst metal having a particle diameter of less than 10 Å. When the particle diameter is more than 300 Å, performance of the catalyst is not sufficient. The particle diameter of the catalyst metal is preferably 15 to 100 Å.

An amount of the catalyst on the electrode is 0.01 to 10 mg/cm$^2$. When an amount of the catalyst is less than 0.01 mg/cm$^2$, the performance of the catalyst does not exhibit itself. When an amount of the catalyst is more than 10 mg/cm$^2$, production costs are high. An amount of the catalyst is preferably 0.1 to 5.0 mg/cm$^2$.

With respect to the conductor, any conductor is acceptable as long as it is a material to conduct a electron. The conductors include various types of metals and carbon materials. The carbon materials include carbon blacks such as furnace black, channel black and acetylene black, activated carbon and graphite. They can be used individually or in combination.

As the water repellant, various types of resins can be used. However, fluorine-contained resins having water repellency are preferable. Of fluorine-contained resins, fluorine-contained resins having excellent heat resistance and oxidation resistance are more preferable. They include polytetrafluoroethylene, a copolymer of tetrafluoroethylene and a perfluoroalkyl vinyl ether and a copolymer of tetrafluoroethylene and hexafluoropropylene.

As a gas diffusion electrode satisfying the above, an electrode manufactured by E-TEK, Inc. is generally used.

In order to assemble a gas diffusion electrode and membrane assembly by using the above electrode, methods are as follows.

A certain amount of a mixture solution of an alcohol and water comprising a sulfonic acid group as an ion exchange group and a dissolved fluorine type polymer similar to a polymer used for an ion exchange membrane, is applied on a catalyst surface of the gas diffusion electrode and dried. The ion exchange membrane is positioned between the above prepared two gas diffusion electrodes, wherein the catalyst surfaces of the electrodes face the ion exchange membrane, and the ion exchange membrane is bonded to the electrodes with heat press. The temperature of this heat press depends on the type of the ion exchange membrane. However, heat press is generally conducted at a temperature of 100° C. or more, often at a temperature of 130° C. or more, sometimes at a temperature of 150° C. or more. At this time, since moisture within the ion exchange membrane is evaporated, so that a shrinking of the ion exchange membrane occurs, it is difficult to attain a uniform bonding. When a water content is reduced at a high temperature of 120° C. or more, the water content, the electrical conductivity and the permeability coefficient to gases sometimes change due to changes of physical properties. Therefore, it is desired to design a method not to reduce the water content even at such a high temperature.

As methods not to extremely evaporate moisture within the membrane at bonding of the ion exchange membrane to the electrodes, there are the following methods. The first method comprises introducing gas into a vessel and sealing it, and then conducting press bonding. The gas comprises moisture having approximately a saturated vapor pressure at a hot press temperature. The vessel withstands a high temperature and pressure at the bonding. The second method comprises conducting heat press with a heat press apparatus after covering the ion exchange membrane and the electrodes with a gasket or heat resistant sheet to prevent an escape of water vapor, decreasing a temperature to 100° C. or less while maintaining the state of the covering and then taking the resultant out of the heat press apparatus. The third method comprises conducting the bonding in hot water. The fourth method comprises conducting the bonding at a temperature as low as possible.

Further, an appropriate amount of water is advantageously added to the membrane in advance to prevent it drying out at the bonding even if moisture is lost at heat press.

Besides the above methods, J. Electrochem. Soc. Vol. 139, No. 2. L28–L30 (1992) describes a method for forming the ion exchange membrane and electrode assembly.

After preparing the ion exchange membrane and electrode assembly such as the above, the assembly is conducted by inserting the ion exchange membrane and electrode assembly between a collector and a graphite or metal flange having a port to introduce gas and a port to discharge gas. In order to operate the fuel cell, hydrogen gas as fuel, and oxygen or air are fed to one gas diffusion electrode and the other respectively.

Since a membrane not having moisture does not operate, the fuel cell is operated at a temperature of 50° to 100° C., at which moisture of the membrane can be controlled. In the present invention, since the water content of the membrane is high, it is relatively easy to control moisture.

The higher a feed pressure of gas is, the higher output the fuel cell produces. Therefore, when the feed pressure of gas is high, the fuel cell efficiently operates. However, when the feed pressure of the gas is too high, there is the possibility that hydrogen gas can mix with oxygen gas through the ion exchange membrane, and then that a dangerous explosion can occur. Therefore, it is preferable that the fuel cell be operated at a pressure at which this danger does not occur. The pressure depends on the thickness of the ion exchange membrane. For example, when the ion exchange membrane has a thickness of about 100 μm, the pressure is 0.5 to 0.5 atm. When the pressure is lower than 10 atm., the output of the fuel cell remarkably decreases because it is difficult to feed gas to a catalyst layer through the gas diffusion electrode. When the pressure is higher than 10 atm., the danger of an explosion undesirably increases due to breakage of the membrane. The pressure is preferably 1 to 10 atm.

With respect to gases to be used, oxygen or air comprising saturated water vapor at about a temperature at which the fuel cell operates, is used as an oxidizing agent gas. Hydrogen comprising saturated water vapor at about a temperature at which the fuel cell operates, is used as a fuel gas. Generally, when air or oxygen having a low pressure is used, the output of the fuel cell decreases because of a low partial pressure of oxygen. However, in the present invention, since the ion exchange membrane used for the fuel cell has all the necessary performance, the output of the fuel cell can be remarkably increased even at a low pressure of about 1 atm., compared with that of other fuel cells.

DETAILED DESCRIPTION OF THE INVENTION

Figure 1:
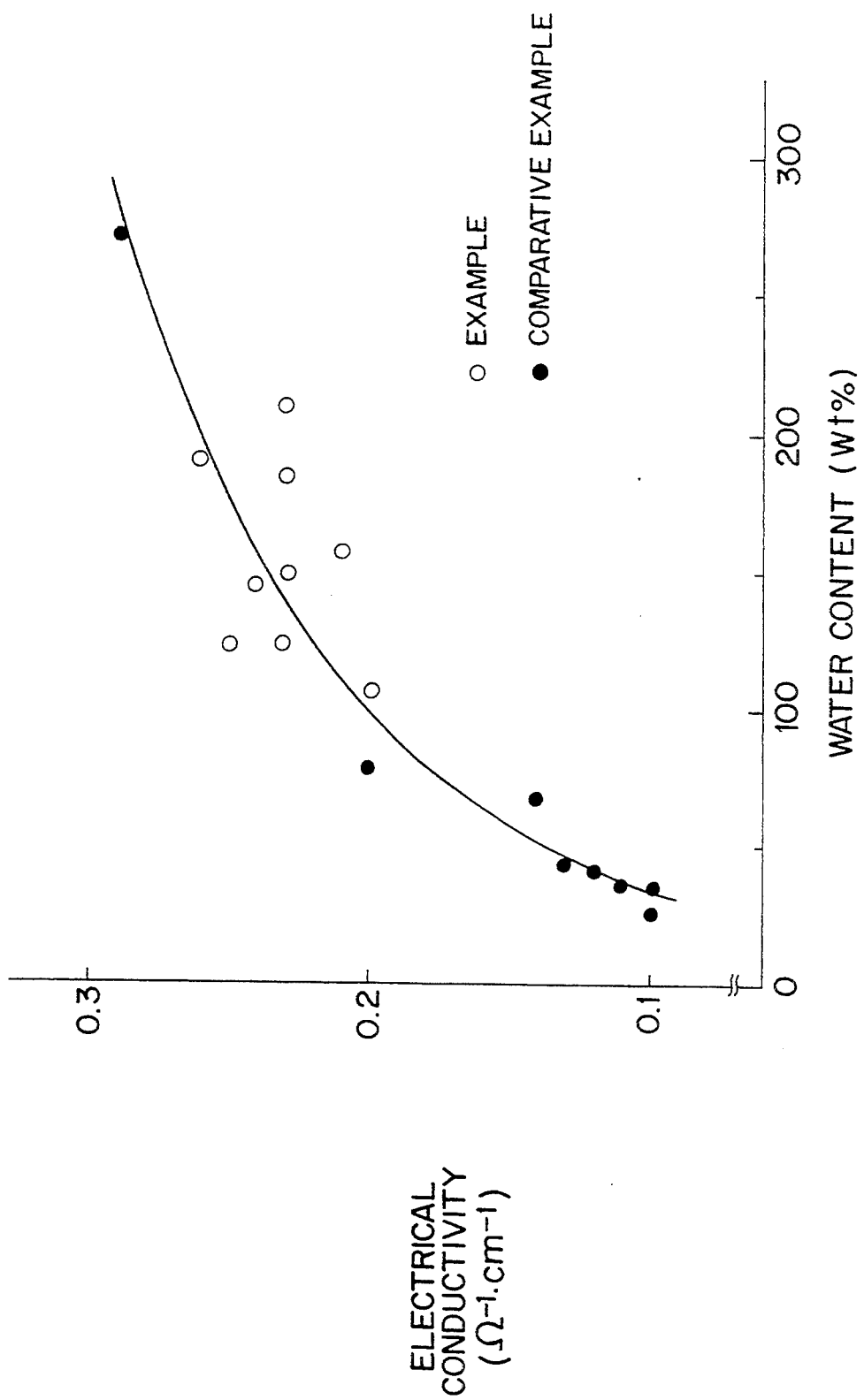
FIG. 1 shows the relation between a water content and an electrical conductivity.

Hereinafter, the present invention will be described with reference to examples and comparative examples, which should not be construed as limiting the scope of the invention.

Methods for measuring an electrical conductivity, a permeability coefficient to oxygen gas, a permeability coefficient to hydrogen gas, a water content and an equivalent weight are as follows.

Method for measuring an electrical conductivity of the ion exchange membrane

An acid type ion exchange membrane is positioned between two unit cells having a platinum electrode similar to a cell used in Mark W. Verbrugge, Robert F. Hill et al. method (J. Electrochem. Soc., Vol.137, No. 12, December 1990). The unit cells are filled with a 32% sulfuric acid solution. Luggin capillarys are arranged on both sides of the ion exchange membrane in order to make a liquid junction between the exchange membrane and a reference electrode. The voltage difference between both sides of the membrane is previously measured in the state which an electrical current is not passed. After that, direct currents are passed under the three conditions of 40, 60 and 80 $mA/cm^2$ respectively in order to measure electric potentials on both sides of the membrane by using a reference electrode. A voltage drop is obtained by subtracting the value of the voltage difference previously measured without passing the electrical current from that measured with passing the electrical current. The electrical conductivity is calculated according to the following equation. The average value of these three values is determined as the value of electrical conductivity of a sample.

$$(L \times I)/(S \times V) = C$$

C: electrical conductivity ($\Omega^{-1}$ cm$^{-1}$)
L: thickness of an ion exchange membrane (cm)
S: area of an ion exchange membrane through which a electrical current is passed (cm$^2$)
I: electrical current (ampere)
V: voltage pressure drop of an ion exchange membrane (volt)

Method for measuring a permeability coefficient to gases of the ion exchange membrane A permeability coefficient to gases is measured by a method according to Tatsuo Sakai, Hiroyasu Takenaka et al.

As a measuring apparatus of the permeability coefficient to gases, YANACO GTR-10XE is used. A membrane comprising water is put into the apparatus at 40° C. While oxygen or hydrogen having a saturated humidity at 40° C. is fed to one side of the membrane at a constant pressure, a vacuum is produced on the other side. An amount of gas passing through the membrane is measured with a gas chromatography. The permeability coefficient to gases is calculated according to the following equation.

$$(q \times k_s \times L)/[(p_1 - p_2) \times A \times t] = K$$

q: amount of passing gas (cc)
$k_s$: cell constant (1.6 is used for the above measuring apparatus)
L: thickness of an ion exchange membrane (cm)
$P_1$: measured partial pressure of feed gases (cm Hg)
$P_2$: pressure on the vacuum side (cm Hg)
A: area where gases pass (cm$^2$)
t: time required to pass gases (sec.)
K: permeability coefficient to gases (cc cm/(cm$^2$ sec cm Hg))

Method for measuring a water content of the ion exchange membrane

The ion exchange membrane is dipped in pure water at room temperature for one night. After wiping moisture off the surface of the membrane, A weight of the membrane is measured as Wa. Next, the membrane is dried under vacuum at a temperature of 90° to 110° C. for 5 hours. Then, while inhibiting the membrane from absorbing moisture, a weight of the dried membrane is measured as Wb. W of the water content is calculated according to the following equation.

$$(W_a - W_b)/W_b \times 100 = W$$

Method for measuring an equivalent weight of the ion exchange membrane 1 to 2 g of a sample of a polymer having a —SO$_3$H type ion exchange group is prepared. After the sample is put into a beaker, 100 cc of a 0.1N sodium hydroxide solution is added the beaker. Further, water is added, and then it is kept at 90° C. while the resultant solution is stirred for 24 hours. Next, the sample is taken out of the beaker and washed with deionized water. After washing, the used deionized water is also put into another beaker. The 0.1N sodium hydroxide solution and the used deionized water are titrated with 0.1N hydrochloric acid. A total amount of both titrations is determined as A (cc). The resultant sample is converted to —SO$_3$H type with sulfuric acid again, and then dried at 110° C. for 24 hours with a vacuum dryer. After drying, a weight of the dried sample is measured. The weight is determined as $W_1$ (g). The equivalent weight (g/eq) is calculated by using A and $W_1$ measured above according to the following equation.

equivalent weight = $W_1/(0.01-0.0001 \times A)$

Samples No. 1 to 6

A perfluoro sodium sulfonate type ion exchange membrane having an equivalent weight of 1080 g/eq and a thickness of 100 μm represented by the following formula (3) was prepared:

$$-[(CF_2-CF_2)_L-(CF_2-CF)_m]- \quad (3)$$
$$| $$
$$(OCF_2-CF)-O-(CF_2)_2-SO_3Na$$
$$|$$
$$CF_3$$

wherein L/m is 6.36.

The prepared ion exchange membrane was dipped in each swelling treatment liquid of ethylene glycol, polyethylene glycol having a molecular weight of 400 and triethanol amine at a constant temperature (each temperature of 130°, 150° and 170° C.) for 6 hours.

Next, after the procedure of dipping the membrane in 0.1 mol/l sodium hydroxide at 90° C. for 16 hours was repeated twice, the membrane was dipped in a 1 mol/l sulfuric acid solution at 60° C. for 16 hours and then was boiled in pure water at 100° C. for 2 hours.
Sample No. 7

A perfluoro sodium sulfonate type ion exchange membrane having an equivalent weight of 1080 g/eq and a thickness of 100 μm represented by the following formula (3), which was not dipped in swelling treatment liquid, was dipped in a 1 mol/l sulfuric acid solution at 60° C. for 16 hours and then was boiled in pure water at 100° C. for 2 hours.
Sample No. 8

NAFION (registered trademark) manufactured by E.I. du pont Nemours and Co. is treated according to the same operation as was used to obtain Sample No. 7.
Sample No. 9

An ion exchange membrane having an equivalent weight of 890 g/eq and a thickness of 100 μm represented by formula (3) was treated according to the same operation as was used to obtain Sample No. 7.
Sample No. 10

An ion exchange membrane having an equivalent weight of 990 g/eq and a thickness of 100 μm represented by formula (3) was treated according to the same operation as was used to obtain Sample No. 7.
Sample No. 11

An ion exchange membrane having an equivalent weight of 1000 g/eq and a thickness of 125 μm represented by formula (3) was treated according to the same operation as was used to obtain Sample No. 7.
Samples No. 12 and 13

An ion exchange membrane having an equivalent weight of 1080 g/eq and a thickness of 125 μm represented by formula (3) was treated according to the same operation as was used to obtain Samples No. 1 to 6 except that diethanol amine was used as a swelling treatment liquid and the swelling treatment liquid was maintained at 150° or 170° C.
Samples No. 14 to 16

An ion exchange membrane having an equivalent weight of 1000 g/eq and a thickness of 125 μm represented by the following formula (3) was treated according to the same operation as was used to obtain Samples No. 1 to 6 except that diethanol amine was used as a swelling treatment liquid and the swelling treatment liquid was maintained at 130°, 150° or 170° C.
Sample No. 17

A polymer having a repeating unit represented by the following formula (4) was obtained by copolymerizing 2-fluorosulfonylperfluoroethylvinylether and tetrafluoroethylene:

$$-[(CF_2-CF)_L-(CF_2-CF)_m]- \quad (4)$$
$$|$$
$$O-(CF_2)_2-SO_2F$$

wherein L/m is 5.02.

The polymer was formed into film. The film was put into a 30% potassium hydroxide solution at 95° C. for 2 hours, and then was put into a 0.4% sodium hydroxide solution at 90° C. for 1 hour. This ion exchange membrane was treated according to the same operation as was used to obtain Sample No. 7.

The ion exchange membrane had a thickness of 125 μm and a equivalent weight of 780 g/eq.
Sample No. 18

Ion exchange membrane having a equivalent weight of 1095 g/eq and a thickness of 125 μm represented by formula (5) was treated according to the same operation as is used to obtain Sample No. 7:

$$-[(CF_2-CF)_L-(CF_2-CF)_m]- \quad (5)$$
$$|$$
$$O-(CF_2)_2-SO_3Na$$

wherein L/m is 8.17.

After each sample of ion exchange membrane obtained in this way was dipped in water at room temperature for one night, the electrical conductivity, the permeability coefficient to oxygen gas, the permeability coefficient to hydrogen gas, the water content and the equivalent weight were measured.

Figure 2:
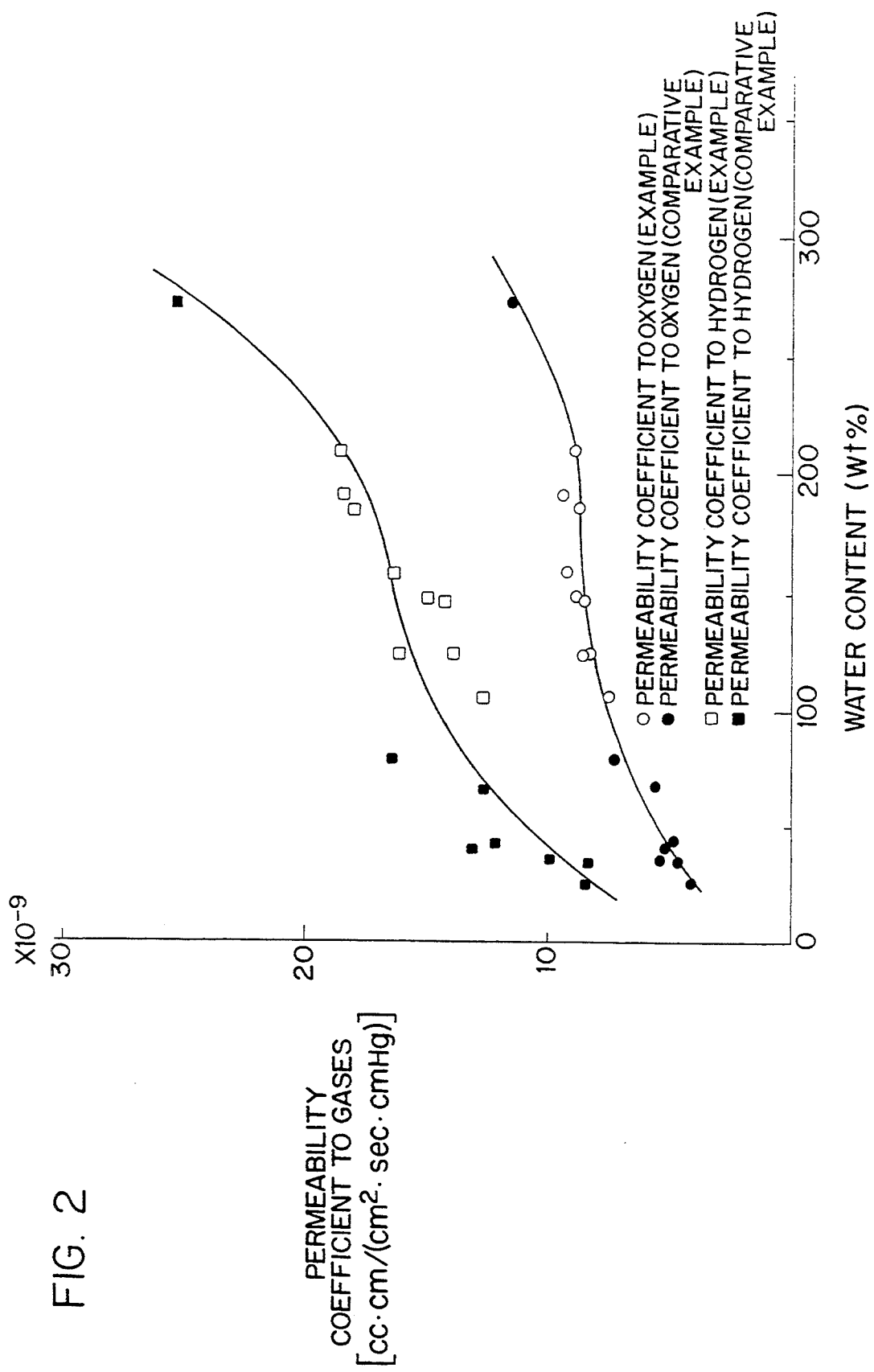
FIG. 2 shows the relation between a water content and a permeability coefficient to gases.

The results are shown in Table 1. The relation between the water content and the electrical conductivity is shown in FIG. 1. The relation between the water content and the permeability to gases is shown in FIG. 2.

Each physical property outside the scope of the present invention is underlined in Table 1. Sample Nos. 1, 2, 4 to 6 and 12 to 15 correspond to examples of the present invention. Sample Nos. 3, 7 to 11 and 16 to 18 correspond to comparative examples.

Next, each fuel cell was assembled by using ion exchange membrane having a diameter of 6 cm of sample Nos. 1, 15 corresponding to examples of the present invention, 7 to 9 and 11 corresponding to comparative examples according to the following procedure.

As electrodes, two gas diffusion electrodes manufactured by E-TEK, Inc. having a diameter of 3.6 cm (an amount of catalyst platinum: 0.38 mg/cm²) per each ion exchange membrane were prepared. A 5 wt. % NAFION (registered trademark) solution is painted on the side having the catalyst of the each gas diffusion electrode with a brush and then dried at 60° C. for 1 hour. At this time, the paint amount was determined so that an amount of the dried ion exchange resin may be 0.65 mg/cm².

The gas diffusion electrodes were put on the both sides of each of the above ion exchange membranes.

Two polytetrafluoroethylene resin gaskets having a diameter of 3.6 cm of a circular aperture and a thickness of 1 mm are put on each outer side of the gas diffusion electrodes to sandwich the exchange membrane and the gas diffusion electrodes so that each gas diffusion electrode may be inserted to the aperture of each gasket.

Further, the opposite side of each gas diffusion electrode facing the ion exchange membrane was covered with KAPTON (registered trademark) film manufactured by Toray Industries, Inc. and E.I. du Pont de Nemours and Co. having a thickness of 0.05 mm so that water vapor may not leak. After the ion exchange membrane and electrode assembly was pressed under the condition of 140° C. and 60 kg/cm² for 90 seconds with a heat press apparatus, it was rapidly cooled to 30° C. while maintaining pressure, and then the ion exchange membrane and electrode assembly was taken out of the press apparatus.

The ion exchange membrane and electrode assembly formed above was inserted between a titanium mesh collector and a titanium flange having a port to introduce gas and a port to discharge gas to assemble a body of a fuel cell.

Figure 3:
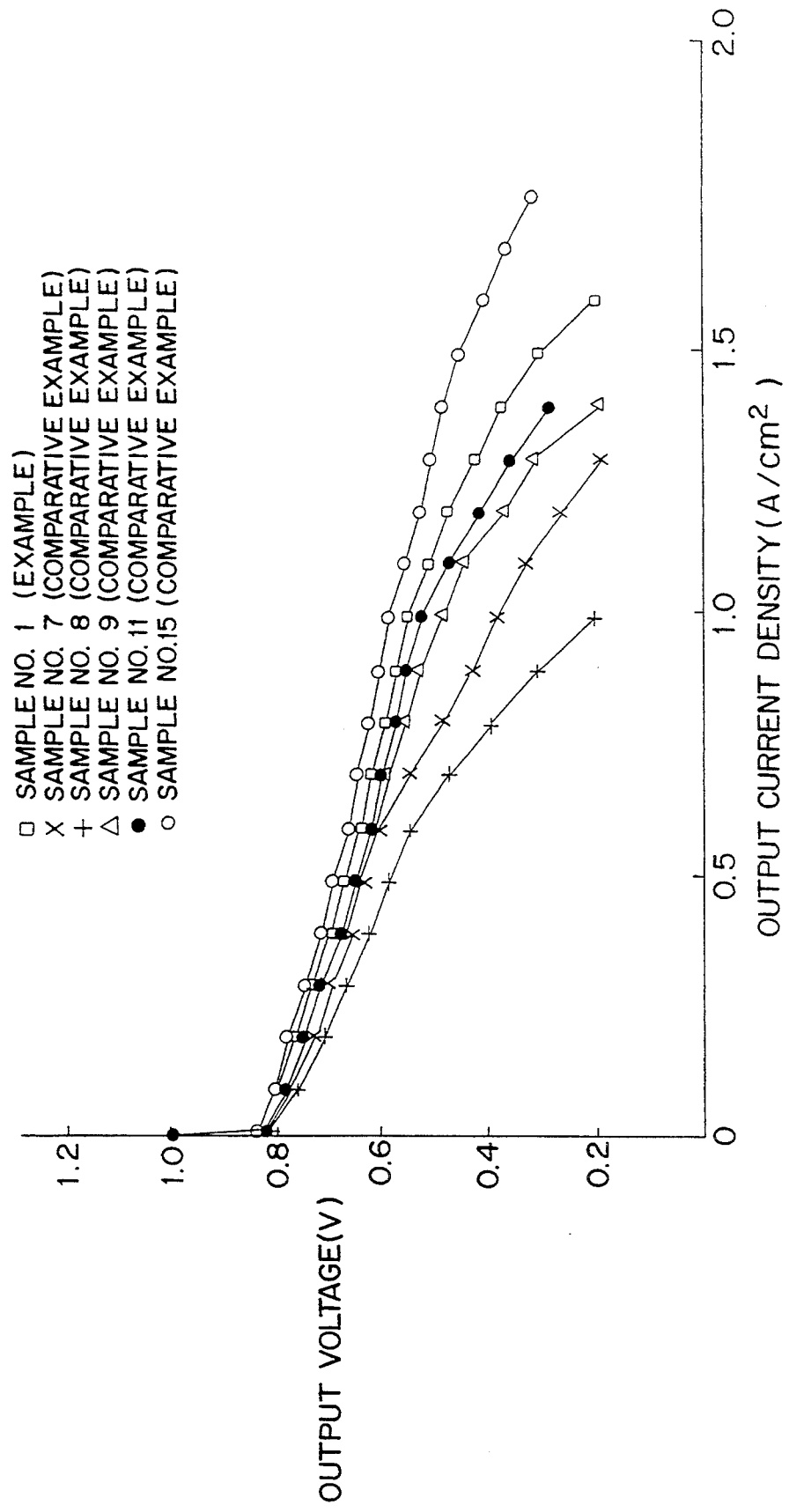
FIG. 3 shows the results of output characteristics of the fuel cells comprising the ion exchange membrane in Examples and Comparative Examples.

Each fuel cell was connected with an external load. Hydrogen gas having saturated water vapor at 55° C. was fed from one port to introduce gas. Oxygen gas having saturated water vapor at 55° C. was fed from the other port to introduce gas. The body of the fuel cell is kept at about 55° C. and 1 atm. while the change of output voltage was measured according to the change of the current density by changing the value of resistance of the external circuit. The results are shown in FIG. 3. As shown in FIG. 3, fuel cells comprising ion exchange membrane sample Nos. 1 and 15 corresponding to examples of the present invention have more excellent output performance than those comprising sample Nos. 7 to 9 and 11 corresponding to comparative examples, and particularly have a great effect on improvement in the output current.

As explained above, according to the present invention, the ion exchange membrane used for a proton exchange membrane type fuel cell having excellent performance as a diaphragm and an electrolyte can be provided by specifying the molecular structure of the ion exchange membrane and limiting its electrical conductivity, permeability to gases and a water content to appropriate ranges.

TABLE 1

| No. | X | Equivalent weight (g/eq) | Treatment liquid | Temperature (°C.) | Water content (%) | Electrical conductivity ($\Omega^{-1}\,cm^{-1}$) | Permeability coefficient to oxygen (cc cm)/(cm² sec cmHg) | Permeability coefficient to hydrogen (cc cm)/(cm² sec cmHg) |
|---|---|---|---|---|---|---|---|---|
| 1 | 1 | 1080 | *1 | 150 | 147 | 0.24 | $8.5 \times 10^{-9}$ | $14.2 \times 10^{-9}$ |
| 2 | | | | 130 | 125 | 0.25 | $8.5 \times 10^{-9}$ | $13.9 \times 10^{-9}$ |
| 3 | | | | 170 | 273 | 0.29 | $11.5 \times 10^{-9}$ | $25.4 \times 10^{-9}$ |
| 4 | | | *2 | 130 | 107 | 0.20 | $7.5 \times 10^{-9}$ | $12.7 \times 10^{-9}$ |
| 5 | | | | 150 | 149 | 0.23 | $8.8 \times 10^{-9}$ | $14.9 \times 10^{-9}$ |
| 6 | | | | 170 | 192 | 0.26 | $9.4 \times 10^{-9}$ | $18.4 \times 10^{-9}$ |
| 7 | | | no swelling treatment | | 36 | 0.10 | $4.7 \times 10^{-9}$ | $8.6 \times 10^{-9}$ |
| 8 | | 1100 | | | 38 | 0.11 | $5.3 \times 10^{-9}$ | $10.0 \times 10^{-9}$ |
| 9 | | 890 | | | 81 | 0.20 | $7.3 \times 10^{-9}$ | $16.4 \times 10^{-9}$ |
| 10 | | 990 | | | 45 | 0.13 | $5.0 \times 10^{-9}$ | $12.2 \times 10^{-9}$ |
| 11 | | 1000 | | | 43 | 0.12 | $5.2 \times 10^{-9}$ | $13.1 \times 10^{-9}$ |
| 12 | | 1080 | *3 | 150 | 125 | 0.23 | $8.4 \times 10^{-9}$ | $16.1 \times 10^{-9}$ |
| 13 | | | | 170 | 186 | 0.23 | $8.7 \times 10^{-9}$ | $18.0 \times 10^{-9}$ |
| 14 | | 1000 | | 130 | 159 | 0.21 | $9.2 \times 10^{-9}$ | $16.4 \times 10^{-9}$ |
| 15 | | | | 150 | 211 | 0.23 | $8.9 \times 10^{-9}$ | $18.5 \times 10^{-9}$ |
| 16 | | | | 170 | 340 | *4 | | |
| 17 | 0 | 780 | no swelling treatment | | 69 | 0.14 | $5.6 \times 10^{-9}$ | $12.8 \times 10^{-9}$ |
| 18 | | 1095 | | | 27 | 0.10 | $4.1 \times 10^{-9}$ | $8.5 \times 10^{-9}$ |

*1 etylene glycol
*2 triethanol amine
*3 diethanol amine
*4 The measurement is impossible due to weak strength of an ion exchange membrane

We claim:

1. An ion exchange membrane used for a proton exchange membrane type fuel cell comprising a repeating unit represented by the following formula (1):

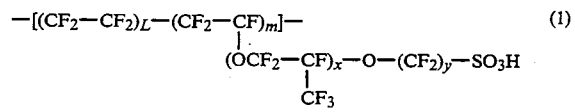

$$-[(CF_2-CF_2)_L-(CF_2-CF)_m]- \quad (1)$$
$$(OCF_2-CF)_x-O-(CF_2)_y-SO_3H$$
$$| \quad CF_3$$

wherein x is 0, 1 or 2, y is 2 or 3, L and m are positive numbers and L/m is 10 or less; and having an electrical conductivity of 0.11 to 0.30 $\Omega^{-1}\,cm^{-1}$ at 25° C., a permeability coefficient to hydrogen gas of $9.0 \times 10^{-9}$ to $24.0 \times 10^{-9}$ cc cm/(cm² sec cmHg) at 40° C., a permeability coefficient to oxygen gas of $5.0 \times 10^{-9}$ to $11.0 \times 10^{-9}$ cc cm/(cm² sec cmHg) at 40° C. and a water content of more than 100 to 250% by weight.

2. The ion exchange membrane used for a proton exchange membrane type fuel cell according to claim 1, wherein the water content is 107 to 250% by weight.

3. The ion exchange membrane used for a proton exchange membrane type fuel cell according to claim 1, wherein the water content is 125 to 250% by weight.

4. The ion exchange membrane used for a proton exchange membrane type fuel cell according to claim 1, 2 or 3, wherein the electrical conductivity is 0.20 to 0.30 $\Omega^{-1}\,cm^{-1}$.

5. The ion exchange membrane used a the proton exchange membrane type fuel cell according to claim 1, 2, or 3, wherein the permeability coefficient to hydrogen gas is $13.5 \times 10^{-9}$ to $24.0 \times 10^{-9}$ cc cm/(cm² sec cmHg) at 40° C.

6. The ion exchange membrane used for a proton exchange membrane type fuel cell according to claim 1, 2 or 3, wherein the permeability coefficient to oxygen gas is $8.0 \times 10^{-9}$ to $11.0 \times 10^{-9}$ cc cm/(cm² sec cmHg) at 40° C.

7. The ion exchange membrane used for a proton exchange membrane type fuel cell according to claim 1, 2 or 3, wherein the ion exchange membrane has a equivalent weight of 700 to 1100 g/eq.

8. The ion exchange membrane used for a proton exchange membrane type fuel cell according to claim 1, 2 or 3, wherein the ion exchange membrane has a thickness of 50 to 500 μm.

9. The ion exchange membrane used for a proton exchange membrane type fuel cell according to claim 1, 2 or 3, wherein the ion exchange membrane is subjected to swelling treatment with water or a water-soluble organic solvent at a temperature of 100° C. or more.

* * * * *

UNITED STATES PATENT AND TRADEMARK OFFICE
CERTIFICATE OF CORRECTION

PATENT NO. : 5,449,697
DATED : Sep. 12, 1995
INVENTOR(S) : Noaki et al.

It is certified that error appears in the above-indentified patent and that said Letters Patent is hereby corrected as shown below:

Column 11, line 3, Table 1, change "(q/eq)" to --(g/eq)--

Signed and Sealed this

Ninth Day of January, 1996

*Attest:*

BRUCE LEHMAN

*Attesting Officer          Commissioner of Patents and Trademarks*